(12) United States Patent
Weik et al.

(10) Patent No.: US 6,824,199 B2
(45) Date of Patent: Nov. 30, 2004

(54) FENDER ARRANGEMENT FOR A MOTOR VEHICLE

(75) Inventors: Eberhard Weik, Weil der Stadt (DE); Thorsten Schelling, Magstadt (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/370,963

(22) Filed: Feb. 19, 2003

(65) Prior Publication Data

US 2004/0007901 A1 Jan. 15, 2004

(30) Foreign Application Priority Data

Feb. 19, 2002 (DE) .......................................... 102 06 768

(51) Int. Cl.⁷ .............................................. B60R 27/00
(52) U.S. Cl. .................................. 296/187.04; 296/198
(58) Field of Search ....................... 296/187.03, 187.04, 296/187.09, 187.1, 187.12, 198

(56) References Cited

U.S. PATENT DOCUMENTS 4,359,120 A * 11/1982 Schmidt et al. ........ 296/187.04
6,547,316 B2 * 4/2003 Chung ........................ 296/198
2002/0063443 A1 * 5/2002 Lee ............................. 296/198
2003/0173802 A1 * 9/2003 Kubota .................. 296/203.02

FOREIGN PATENT DOCUMENTS

DE   100 09 363   8/2001
DE   100 09 364   8/2001

* cited by examiner

Primary Examiner—D. Glenn Dayoan
Assistant Examiner—Jason Morrow
(74) Attorney, Agent, or Firm—Kenyon & Kenyon

(57) ABSTRACT

A fender arrangement that is simple to manufacture and mount extends at least partially over the vehicle body and has an upper edge, and a reinforcement element including multiple sections positioned along the upper edge on the inside of the fender, the sections of the reinforcement element forming a hollow profile with the fender, where the reinforcement element is connected to the vehicle body via at least one connection section forming a hollow profile.

14 Claims, 3 Drawing Sheets

FENDER ARRANGEMENT FOR A MOTOR VEHICLE

CROSS-REFERENCE TO RELATED APPLICATIONS

The present application claims priority to Application No. 102 06 768.6, filed in the Federal Republic of Germany on Feb. 19, 2002.

FIELD OF THE INVENTION

The present invention relates to a fender arrangement for a motor vehicle. Such a fender arrangement extends at least partially over a vehicle body and extends along a lateral edge of a front hood. The upper edge of the fender and the lateral edge of the front hood form a partition line.

BACKGROUND INFORMATION

In connection with measures for improved protection of pedestrians, making fenders flexible in the region of the upper edge next to the partition line and simultaneously ensuring sufficient strength of the connection of the fender to the vehicle body is described, for example, in German Published Patent Application No. 100 09 364. To reduce the structural rigidity of the fender upper edge, it is suggested that a c-shaped deformation element, which supports the upper edge against the vehicle body, be provided below the upper edge of the fender. In addition to the deformation element, a separate support part is provided, which extends between the point at which the deformation element abuts the vehicle body and an outer wall section at a distance from the upper edge of the fender and ensures the necessary stability.

Furthermore, a construction which reduces the structural rigidity of a fender upper edge, which has a reinforcement part positioned along the upper edge on the inside of the fender, forming a hollow profile with the fender, is described in German Published Patent Application No. 100 09 363. In addition to the reinforcement part, a separate supporting part is provided, which supports the reinforcement part on the vehicle body.

Both of these approaches provide that multiple separate components, which must each be manufactured and assembled individually, are necessary to connect the fender to the vehicle body.

It is an object of the present invention to provide a fender arrangement, which may be simple to manufacture and assemble.

SUMMARY

The above and other beneficial objects of the present invention may be achieved by providing a fender arrangement as described herein.

Accordingly, the arrangement according to an example embodiment of the present invention has a fender having an upper edge and a reinforcement element. The reinforcement element includes different sections, which are each positioned at specific angles to one another. The different sections of the reinforcement element form a hollow profile with the fender. The arrangement according to the present invention may provide that the reinforcement element is connected to the vehicle body via at least one of its sections—a connection section—this connection section being spaced at a distance from the fender.

The fender arrangement according to the present invention may provide that only one component is provided—the reinforcement element—which fulfills both aspects: sufficient mobility of the fender upper edge to improve pedestrian protection and sufficient strength of the connection between the fender and the vehicle body. The combination of the different functions into one component may provide significant economic advantages, because only one part must be manufactured and mounted. In this manner, both the manufacturing and the assembly costs may be reduced. A reduction of these costs may represent an advantage, in particular in products which are manufactured in series, as is the case of motor vehicles.

Example embodiments of the present invention are described below.

According to an example embodiment, the reinforcement element has a deformation section. This section is connected to the upper edge of the fender. The deformation section supports the upper edge of the fender on the vehicle body, but is designed such that the upper edge yields when a specific force is exerted upon it, through which the deformation section is deformed. At the same time, the deformation section absorbs energy. In order to be able to make the deformation section sufficiently flexible, the reinforcement element having its different sections may be made of metal. The degree of mobility and the level of energy absorption may, for example, be influenced via the thickness of the deformation section or via the specific material. In order to increase the mobility, intentionally introducing material weaknesses into the deformation section is possible. These types of material weaknesses may be any known weaknesses of the material. Examples of these include recesses, notches, etc.

Furthermore, the reinforcement element may have a support section, which is attached to a section of the fender at a distance from the fender upper edge and supports this part of the fender on the vehicle body. The section may be used for ensuring sufficient stability of the connection of the fender to the vehicle body. In particular, it may be necessary for preventing vibrations but also ensuring absorption of forces oriented transversely to the fender. The necessary strength of the support section may—similarly to the design of the properties of the deformation section—be produced via the material thickness and/or the selection of the suitable material.

The connection section may be positioned between the deformation and support sections. The deformation and support sections produce the necessary distance between the connection section and the fender. In this manner, it is possible to combine the different functions of the reinforcement element according to the present invention. Since the reinforcement element is implemented in one piece, the connection section may also be made of metal.

Manufacturing the reinforcement element from another material, for example, from plastic, a fiber-reinforced material, etc., is also possible. In order to be able to adjust the different properties of individual sections, making the individual sections in different thicknesses is possible. For example, making the deformation section thinner than the support section is possible. Furthermore, coating the support section with a material having a reinforcing effect is possible. It is also possible to manufacture the entire reinforcement element having its different sections in one thickness and intentionally weaken the deformation section in a specific manner, as described above.

The reinforcement element may, for example, have a U-shaped cross-section, one leg forming the deformation section and the other leg forming the support section. The transverse connection of the two legs is produced by the connection section. Such a shape may provide that it may be manufactured especially easily.

The reinforcement element may extend in one piece along the entire upper edge of the fender in the lengthwise direction of the vehicle. In this manner, only one reinforcement element may be manufactured per fender. However, it is also possible to position multiple reinforcement elements one behind another along the upper edge of the fender.

According to an example embodiment, the deformation and support sections are aligned essentially parallel to one another. Attachment regions may be provided on the two sections. In particular, it may be provided that these attachment regions are connected in one piece with the sections. It is possible for the attachment regions to be made of the same material as the reinforcement element and have special features for easy attachment.

If the attachment regions are aligned parallel to the fender, the reinforcement element may be connected to the fender very easily. The parallel alignment may allow multiple connection methods, of which only gluing, welding, riveting, flanging, folding, etc., are to be mentioned here. However, providing a detachable connection between the fender and the reinforcement element is also possible.

The same applies for the connection between the reinforcement element and the vehicle body. In this context, a detachable connection may provide that a damaged fender may be replaced with a new one very easily. Dismounting a fender may be possible very easily with a detachable connection.

In order to simplify this mounting-further, a recess may be provided at suitable points in the reinforcement element. Such a recess may allow an attachment element to be achieved which produces a connection between the reinforcement element and the vehicle body. It is also possible for these recesses to be laid out such that they simultaneously represent the intentional material weakening of the deformation section. Such a double function of the recesses may provide an advantageous effect on the costs of the reinforcement element in turn, because in this manner a step may be saved during manufacturing.

The present invention is described below in greater detail with reference to the exemplary embodiments illustrated in the drawings.

DETAILED DESCRIPTION

Figure 1:
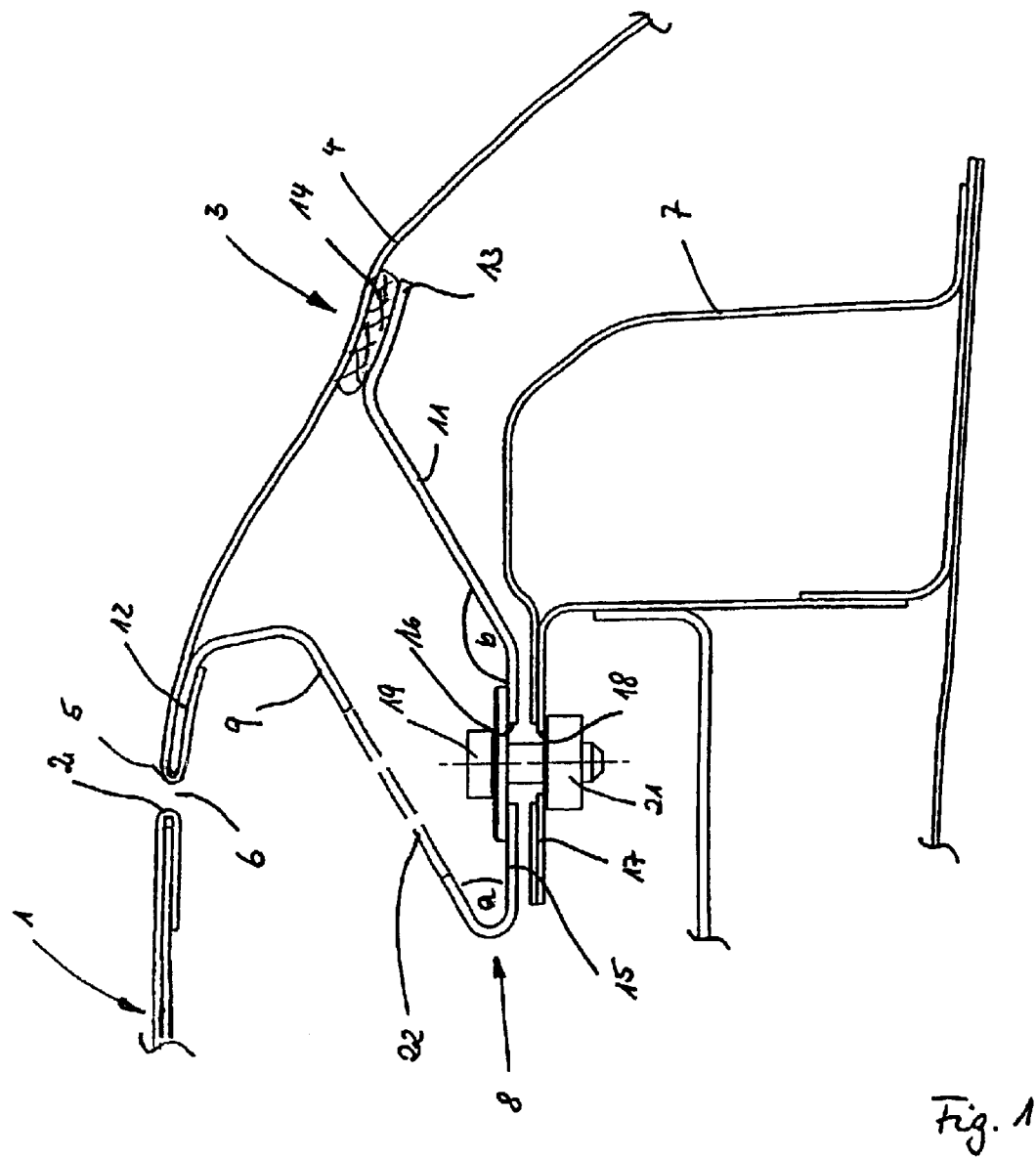
FIG. 1 is a cross-sectional view through an example embodiment of a fender arrangement according to the present invention.

In the cross-sectional illustration, first a front hood 1 of a vehicle having a lateral edge 2 may be seen. Fender arrangement 3 according to the present invention adjoins this lateral edge 2 of front hood 1. This arrangement has a fender 4 having an upper edge 5 positioned on its end facing front hood 1. Upper edge 5 of fender 4 and lateral edge 2 of front hood 1 form a partition line 6, which extends essentially in the lengthwise direction of the vehicle.

Fender 4 is a molded sheet metal part and extends at least partially over a vehicle body 7. The part of fender 4 extending over vehicle body 7 is oriented more or less horizontally. Fender 4 also includes a further section, which is oriented essentially vertically and forms the lateral molding of a vehicle. There is a transition region between these two regions.

Fender arrangement 3 according to the present invention also includes a reinforcement element 8. Reinforcement element 8 has an essentially U-shaped cross-section. The open end of the U points in the direction of the fender and forms a hollow profile with the fender. A leg of reinforcement element 8 is positioned along upper edge 5 of fender 4. In the exemplary embodiments illustrated, reinforcement element 8 includes three different sections. A deformation section 9 and a support section 11 form the two legs of the U. The third section, specifically a connection section 15, described in more detail below, is located between these two sections.

Deformation section 9 illustrated in FIG. 1 is connected to upper edge 5 of fender 4. In order to achieve a connection which is secure and easy to produce, an attachment region 12 is molded onto deformation section 9. Attachment region 12 is formed by bending over the upper region of deformation section 9. Attachment section 12 of deformation section 9 extends essentially parallel to fender 4 at the point at which deformation section 9 and fender 4 meet one another. In the exemplary embodiments illustrated, deformation section 9 and fender upper edge 5 are connected to one another via a flange. This connection technique may be advantageous because upper edge 5 of fender 4 may be processed so that no sharp edges are allowed to arise. Using flanging, both steps—edge machining and connection—may be combined, which may reduce the mounting costs.

Support section 11 is connected to a part of fender 4 at a distance from upper edge 5. The connection point is located in the region of the transition of the horizontal region of fender 4 to the vertical region. An attachment region 13 is also provided on support section 11, which is formed by bending over support section 11. In the exemplary embodiment illustrated, support section 11 and fender 4 are connected to one another with the aid of adhesive 14. This connection technique may provide that the appearance of the surface of fender 4 pointing outwardly is not affected.

However, selecting another connection technique, such as welding, is also possible. In this case—if the outlay for subsequent treatment is to be kept low—a trim strip may be positioned on the fender on the surface pointing outwardly at the height of the weld.

Deformation section 9 and support section 11 are connected to one another via a connection section 15. This forms the lower part of the U between the two legs. However, reinforcement element 8 is also connected to vehicle body 7 via connection section 15. In the exemplary embodiment illustrated, this connection is produced via a detachable connection, specifically a bolted connection. For this purpose, a hole is introduced into connection section 15. The vehicle body 7 has a flange 17, into which a hole 18 is also introduced. A bolt 19 is passed through holes 16 and 18 and secured using a nut 21. A detachable connection may provide that fender 4 may be replaced easily. However, any other type of connection is also possible.

Connection section 15 of reinforcement element 8 is made flat and is arranged on flange 17 of vehicle body 7, which is also made flat. Any other geometric arrangement is also possible for both components. They may only be tailored to one another such that a connection may be produced between them.

Deformation section 9 and support section 11 also have a flat region. These flat regions of sections 9 and 11 are parallel in the exemplary embodiment illustrated. Deformation section 9 and connection section 15 enclose an acute angle a in this case. In contrast, support section 11 and connection section 15 enclose an obtuse angle b.

A curved region, which merges in turn into attachment region 12, adjoins the flat region of deformation section 9. Recesses 22 are introduced into the flat region of deformation element 9. These may be used for easier mounting of the bolted connection between reinforcement element 8 and vehicle body 7. The recesses may fulfill a further function in addition to simplifying mounting, e.g., to weaken deformation section 9 in a specific manner so that upper edge 5 of the fender is sufficiently flexible under the effect of a force. Deformation element 9 may also have any other contour which favors the flexible properties of this section.

Figure 2:
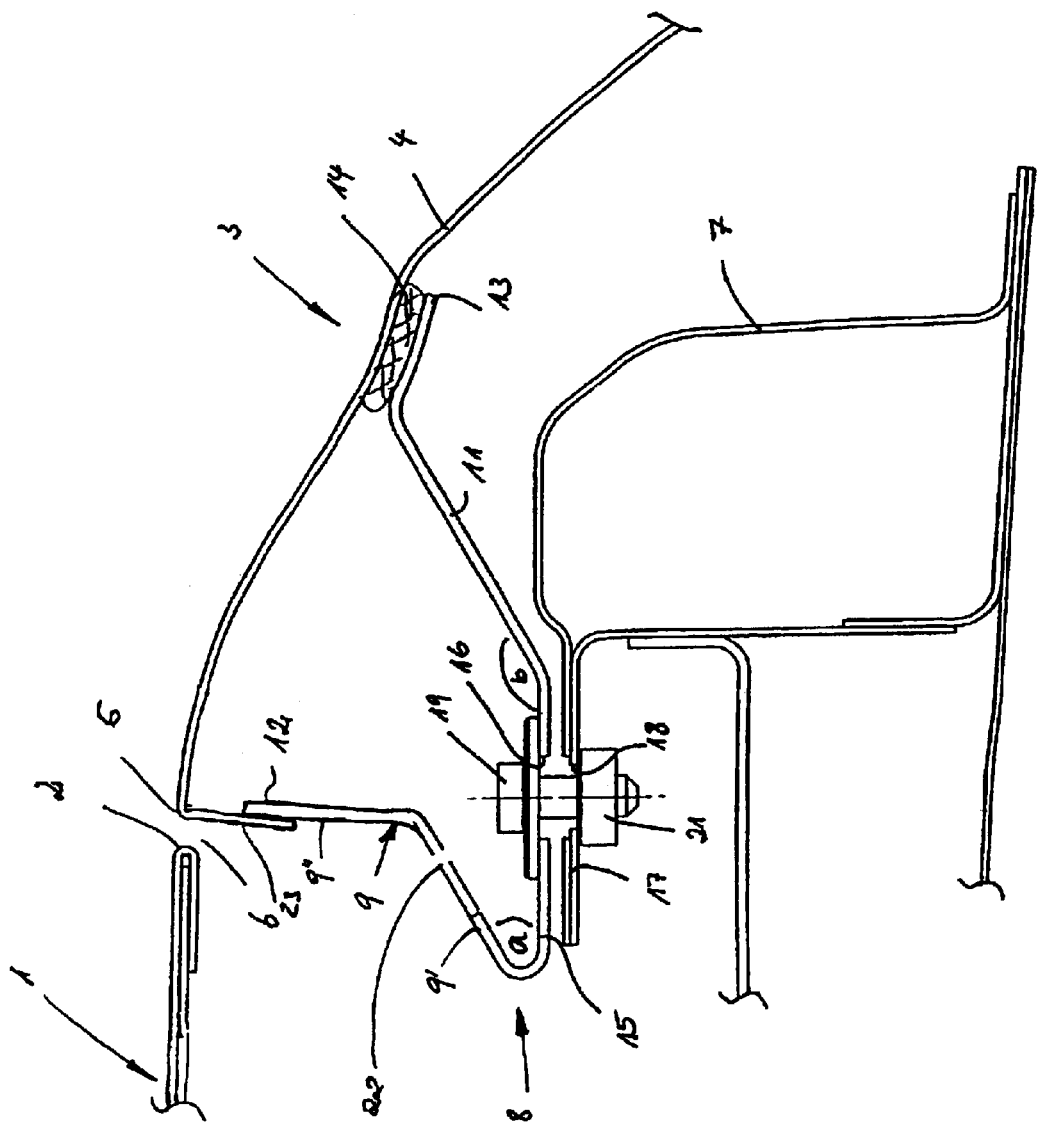
FIG. 2 is a cross-sectional view through a further example embodiment of a fender arrangement according to the present invention.

Such a further contour is illustrated in FIG. 2. In this case, deformation section 9 includes two straight parts 9' and 9", which are positioned at a specific angle to one another. Part 9' adjoins connection section 15 and has a recess 22. Part 9" projects vertically upward and is connected to fender 3 via an attachment region 12. For this purpose, fender 3 also has an attachment region 23 in the region of its upper edge 5. Attachment region 23 is positioned perpendicularly to the curve of the fender in the region of upper edge 5 and is aligned in the direction of vehicle body 7. Therefore, both attachment regions 23 and 12 extend parallel. In the cross-sectional view illustrated in FIG. 2, they overlap at least partially. They are connected to one another in this overlap region. All possible connection techniques are also possible for this connection. A welded connection is mentioned as an example.

Figure 3:
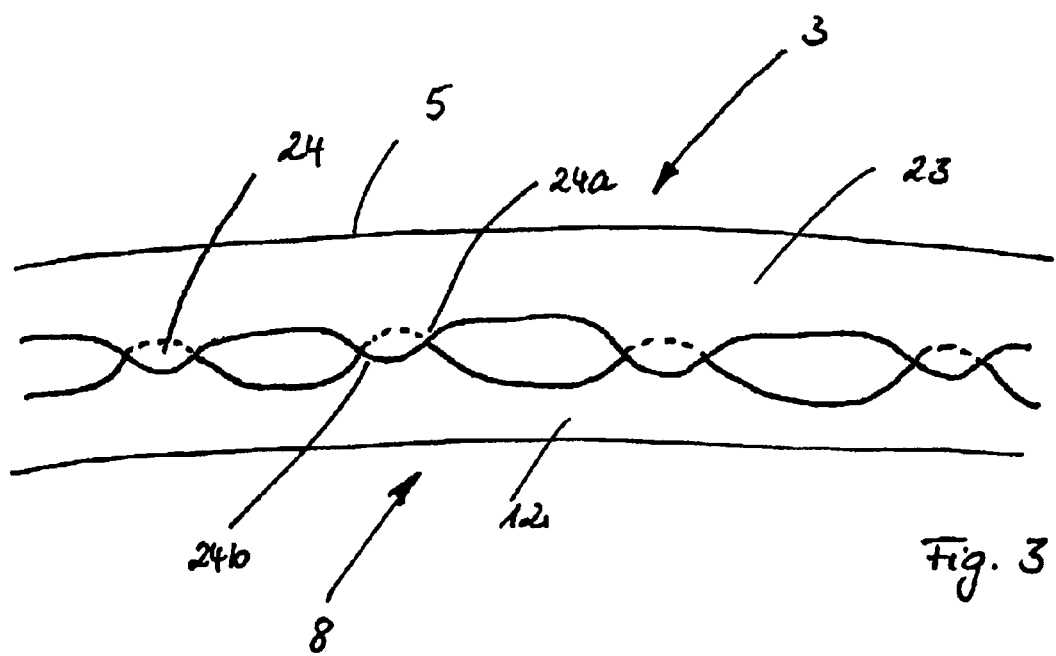
FIG. 3 is a side view of a connection point on a fender upper edge.

To make the arrangement according to the present invention sufficiently flexible, fender 3 and deformation section 9 are not connected to one another over the entire length of reinforcement element 8 (cf. FIG. 3). Rather, attachment regions 23 and 12 only overlap in regions 24, which are spaced apart. These regions 24 arise in that fender 3 and deformation section 9 have deformations 24a and 24b, which are tailored to one another such that they overlap in regions 24. Deformations 24a and/or 24b represent extensions of the components. In the exemplary embodiment illustrated, a wave-shaped edge of attachment regions 12 and 23 arises due to deformations 24a and/or 24b.

Support section 11 is aligned relative to the attachment section such that it abuts fender 4 approximately perpendicularly. In this case as well, any other alignment which may ensure sufficient stabilization of the fender arrangement is possible.

Through the flexible design of a leg of reinforcement element 8, deformation section 9, it may be ensured that upper edge 5 of fender 4 may yield sufficiently. In this manner, the risk of injury in the event of a pedestrian impact on the front part of a vehicle may be significantly reduced. However, the second leg of reinforcement element 8, support section 11, simultaneously may ensure sufficient structural rigidity of overall fender arrangement 3, so that the fender, which is designed to be flexible, may not have its other functions impaired.

What is claimed is:

1. A fender arrangement extending at least partially over a vehicle body, comprising:

a fender having an upper edge; and a reinforcement element including multiple sections and positioned along the upper edge on an inside of the fender, the sections of the reinforcement element forming a hollow profile with the fender, the reinforcement element including at least one connection section forming the hollow profile and configured to connect the reinforcement element to the vehicle body;

wherein the reinforcement element includes a deformation section connected to the upper edge of the fender, the deformation section and the connection section enclosing an acute angle.

2. A fender arrangement according claim 1, extending at least partially over a vehicle body, comprising:

a fender having an upper edge; and a reinforcement element including multiple sections and positioned along the upper edge on an inside of the fender, the sections of the reinforcement element forming a hollow profile with the fender, the reinforcement element including at least one connection section forming the hollow profile and configured to connect the reinforcement element to the vehicle body;

wherein the reinforcement element includes a support section connected to a fender section at a distance from the upper edge.

3. A fender arrangement extending at least partially over a vehicle body, comprising:

a fender having an upper edge; and a reinforcement element including multiple sections and positioned along the upper edge on an inside of the fender, the sections of the reinforcement element forming a hollow profile with the fender, the reinforcement element including at least one connection section form ing the hollow profile and configured to connect the reinforcement element to the vehicle body;

wherein the reinforcement element includes a deformation section connected to the upper edge of the fender; and wherein the reinforcement element includes a support section connected to a fender section at a distance from the upper edge, the connection section positioned between the deformation section and the support section.

4. The fender arrangement according to claim 1, wherein the reinforcement element includes a U-shaped cross-section.

5. The fender arrangement according to claim 1, wherein the reinforcement element is oriented substantially in a lengthwise direction of the vehicle.

6. The fender arrangement according to claim 1, wherein the reinforcement element extends in one piece along an entire upper edge of the fender.

7. A fender arrangement extending at least partially over a vehicle body, comprising:

a fender having an upper edge; and a reinforcement element including multiple sections and positioned along the upper edge on an inside of the fender, the sections of the reinforcement element forming a hollow profile with the fender, the reinforcement element including at least one connection section forming the hollow profile and configured to connect the reinforcement element to the vehicle body;

wherein the reinforcement element includes a deformation section connected to the upper edge of the fender; and wherein the reinforcement element includes a support section connected to a fender section at a distance from the upper edge, the deformation section and the support section oriented substantially in parallel with each another.

8. A fender arrangement extending at least partially over a vehicle body, comprising:

a fender having an upper edge; and a reinforcement element including multiple sections and positioned along the upper edge on an inside of the fender, the sections of the reinforcement element forming a hollow profile with the fender, the reinforcement element including at least one connection section forming the hollow profile and configured to connect the reinforcement element to the vehicle body;

wherein the reinforcement element includes a deformation section connected to the upper edge of the fender; and wherein the reinforcement element includes a support section connected to a fender section at a distance from the upper edge, each of the deformation section and the support section including an attachment region.

9. The fender arrangement according to claim 8, wherein each attachment region is oriented in parallel with a curve of a linked fender region.

10. The fender arrangement according to claim 9, wherein the attachment regions extend over an entire length of the reinforcement element.

11. The fender arrangement according to claim 9, wherein the attachment regions overlap the fender in regions spaced apart from each other.

12. The fender arrangement according to claim 1, further comprising a detachable connection configured to connect the reinforcement element to the vehicle body.

13. The fender arrangement according to claim 1, wherein the reinforcement element includes at least one recess.

14. The fender arrangement according to claim 13, wherein the reinforcement element includes a deformation section connected to the upper edge of the fender, the recess arranged in the deformation section.

* * * * *

UNITED STATES PATENT AND TRADEMARK OFFICE
CERTIFICATE OF CORRECTION

PATENT NO. : 6,824,199 B2  
DATED : November 30, 2004  
INVENTOR(S) : Weik et al.

It is certified that error appears in the above-identified patent and that said Letters Patent is hereby corrected as shown below:

Column 3,  
Line 47, change "this mounting-further" to -- this mounting further --;

Column 6,  
Line 46, change "A fender arrangement according claim 1," to -- A fender arrangement --; and  
Line 67, change "connection section form" to -- connection section form- --.

Signed and Sealed this

Ninth Day of May, 2006

JON W. DUDAS  
*Director of the United States Patent and Trademark Office*